United States Patent
Toriyama et al.

[11] Patent Number: 5,831,589
[45] Date of Patent: Nov. 3, 1998

[54] SYSTEM OF NOTIFICATION OF COMMONLY DISPLAYED CONTENT ON PREDETERMINED DISPLAYS USING ONLY REFERENCE NUMERALS WHICH ARE IN ADVANCE ATTACHED TO IMAGES

[75] Inventors: Shigehiro Toriyama, Kanagawa; Haruo Hiki, Tokyo, both of Japan

[73] Assignee: Sony Corporation, Tokyo, Japan

[21] Appl. No.: 776,323
[22] PCT Filed: May 24, 1996
[86] PCT No.: PCT/JP96/01392
§ 371 Date: Apr. 17, 1997
§ 102(e) Date: Apr. 17, 1997
[87] PCT Pub. No.: WO96/37847
PCT Pub. Date: Nov. 28, 1996

[30] Foreign Application Priority Data

May 25, 1995 [JP] Japan .................................. 7-126374

[51] Int. Cl.$^6$ ........................................................ G09G 5/34
[52] U.S. Cl. ............................. 345/112; 345/115; 345/30; 345/123
[58] Field of Search ..................... 345/115, 418, 345/121, 112, 123, 30

[56] References Cited

U.S. PATENT DOCUMENTS

| | | |
|---|---|---|
| 5,029,112 | 7/1991 | Sakamoto et al. .................. 345/418 |
| 5,495,267 | 2/1996 | Fujitaka .............................. 345/123 |
| 5,757,369 | 5/1998 | Ohsawa et al. ..................... 345/340 |

FOREIGN PATENT DOCUMENTS

| | | |
|---|---|---|
| 4-302054 A | 10/1992 | Japan . |
| 5-12152 A | 1/1993 | Japan . |
| 8-147391 A | 6/1996 | Japan . |

*Primary Examiner*—Krisna Lim
*Attorney, Agent, or Firm*—Frommer Lawrence & Haug LLP; William S. Frommer

[57] ABSTRACT

An image control circuit of one terminal apparatus reads image data corresponding to a designated reference numeral from a display content storage circuit and displays this on a monitor device and, at the same time, transmits the data indicating the reference numeral to another terminal apparatus via a communication line. An I/F circuit of the other terminal apparatus receives the reference numeral sent from the first terminal apparatus side nd outputs this to its image control circuit. The image control circuit of the other terminal apparatus stores this data in the display content storage circuit and, at the same time, reads the reference numeral and the image data corresponding to this reference numeral from the display content storage circuit and displays the same in a predetermined part of the screen of the monitor device.

4 Claims, 4 Drawing Sheets

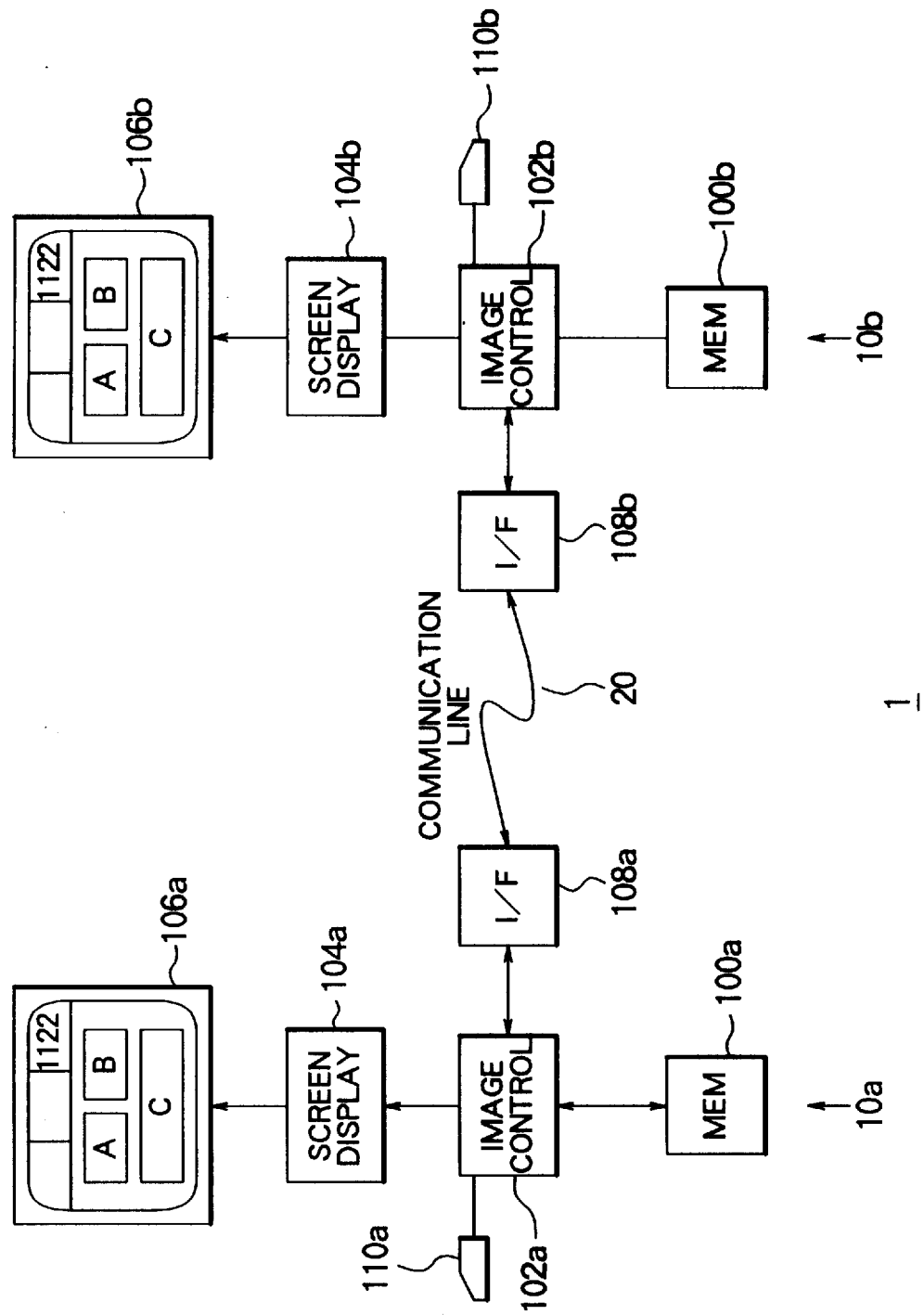

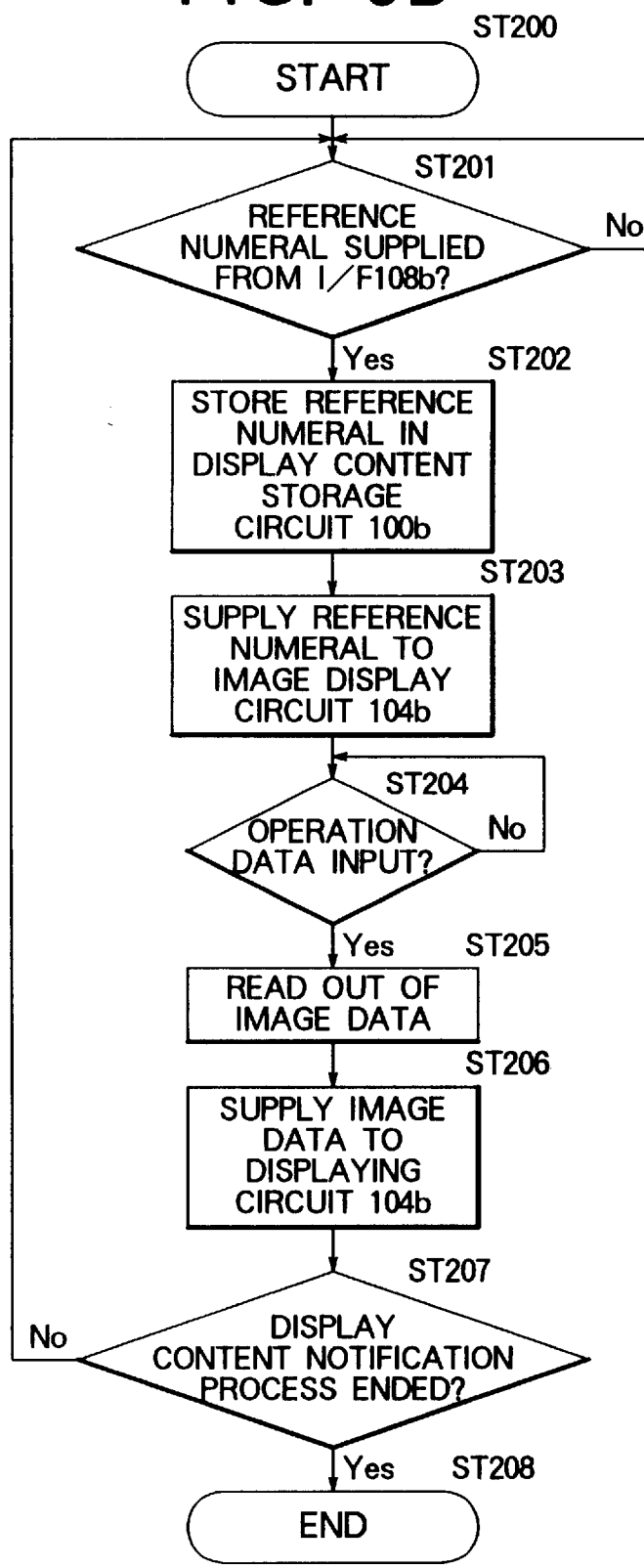

SYSTEM OF NOTIFICATION OF COMMONLY DISPLAYED CONTENT ON PREDETERMINED DISPLAYS USING ONLY REFERENCE NUMERALS WHICH ARE IN ADVANCE ATTACHED TO IMAGES

TECHNICAL FIELD

The present invention relates to a method of notification of displayed content for notifying the displayed contents of for example image display apparatuses connected to each other via communication lines mutually among these image display apparatuses and to an apparatus for the same.

BACKGROUND ART

Networks in which a plurality of terminals such as personal computers are connected via communication lines such as telephone lines etc. and data is transmitted to and received from each other are being actively utilized.

In the above networks, for example, it is difficult for a certain user to inform the contents of the image currently being displayed on his own terminal to another user. Even if it is assumed that the image is included in a manual of the terminal, this is very troublesome, for example, the page on which the image is carried in the manual must be informed to the other party.

Further, in the case where for example a certain user is informing another user of a method of inputting data when using a specified software, there are sometimes cases where it is desirable that a common image be displayed at a plurality of terminals.

There is existing communication software suitable for such use, but where the existing software is used, there arises a problem that the time required for the transmission of the data between the terminals becomes long, a high speed communication line becomes necessary, etc. due to the fact that all of the data of the image must be transmitted each of the plurality of terminals etc.

The present invention was made in consideration with the above-mentioned problems of the related art and has as an object thereof to provide a method of notification of display content among a plurality of terminals with which the content of an image displayed on a certain terminal can be accurately notified to another terminal and an apparatus for the same.

Further, the present invention has as its object to provide a method of notification of display content with which, even in a case where a common image is to be displayed on a plurality of terminals connected to a network, the time required for the transmission of the data is short and in addition a high speed communication line is not required and an apparatus for the same.

DISCLOSURE OF THE INVENTION

The method of notification of display content according to the present invention is a method of notification of display content for notifying the display content of a predetermined screen of an image display apparatus to another party communicated with, wherein: a predetermined reference numeral is attached to each of a plurality of images to be displayed on the predetermined screen; at least one image among the plurality of images and the reference numerals individually attached to these images is displayed on the predetermined screen of the image display apparatus; and at least one reference numeral among those of the plurality of images is notified to the other party communicated with.

Preferably, the other party communicated with stores the data of the plurality of images and the reference numerals in advance into correspondence with each other and displays at least one image among the plurality of images individually corresponding to the notified reference numerals on a predetermined screen of a monitor screen.

Preferably, the other party communicated with sequentially stores the notified reference numerals and displays the images corresponding to the stored reference numerals on a predetermined screen of a monitor screen along with the elapse of time in accordance with an outside operation.

Further, the display content notifying apparatus according to the present invention is a display content notifying apparatus for mutually notifying the contents of images respectively displayed by a plurality of image display apparatuses between these plurality of image display apparatuses connected to each other via predetermined communication lines, wherein each of the plurality of image display apparatuses has a monitor means; a storing means for storing data of a plurality of images to be commonly displayed at the plurality of image display apparatuses and reference numerals commonly attached to these images respectively in the plurality of image display apparatuses in correspondence with each other; a first displaying means for displaying at least one image of the stored plurality of images and the reference numeral of the image on the monitor means; a notifying means for notifying the reference numerals of the images displayed on the monitor means to at least one among the other image display apparatuses via the communication line; and a second displaying means for displaying at least the reference numerals notified from any of the other image display apparatuses via the communication line on the monitor means.

The method of notification of display content according to the present invention is a method of notification of display content for notifying the display contents of screens of monitor devices of terminals such as personal computers or video editing apparatuses connected to each other via for example a telephone line to the terminals of other parties communicated with and making them display the same image.

When preparing the data of the images to be displayed on a plurality of terminals connected to each other in advance, individually attaching predetermined reference numerals to these plurality of images in advance, and making the terminal of another party display the same image, not the data of the images per se, but only the reference numerals need be transmitted.

Where a certain terminal is made to display at least one image among the plurality of images, these images and the reference numerals individually attached to the images to be displayed are displayed on the predetermined screen of the personal computer, video editing apparatus, or the like.

When a reference numeral is displayed together with an image in this way, the user of that terminal can inform the other party of the reference numeral of the image and therefore it is possible for example for the user to input the reference numeral to his own terminal in the form of alphanumerics etc. which are the transmitted to the other party communicated with to specify the image which should be displayed.

In the terminal of the other party communicated with, this reference numeral can be used for displaying the same image. In addition, for example, it is also possible to sequentially store these reference numerals and use then as the history information of the images displayed on the terminal of the other party.

Further, where the system is configured so that the reference numeral of the image displayed on a certain terminal is automatically notified to the other party communicated with and the terminal of the other party communicated with automatically displays this, the trouble of the user when making a plurality of terminals display the same image can be omitted.

BRIEF DESCRIPTION OF THE DRAWINGS

The above objects and features of the present invention will be more apparent from the following description of the preferred embodiments with reference to the accompanying drawings, wherein:

FIG. 1 is a view illustrating the configuration of a network to which the method of notification of display content according to the present invention and the apparatus thereof are applied in the case of two terminals;

FIG. 3A and FIG. 3B are flowcharts showing an operation of an image control circuit of a display content notifying apparatus shown in FIG. 1.

BEST MODE FOR CARRYING OUT THE INVENTION

Below, an embodiment of the present invention will be explained.

FIG. 1 is a view illustrating the configuration of a network 1 to which the display content notifying method according to the present invention and the apparatus thereof are applied in the case of two terminals.

Figure 2A:
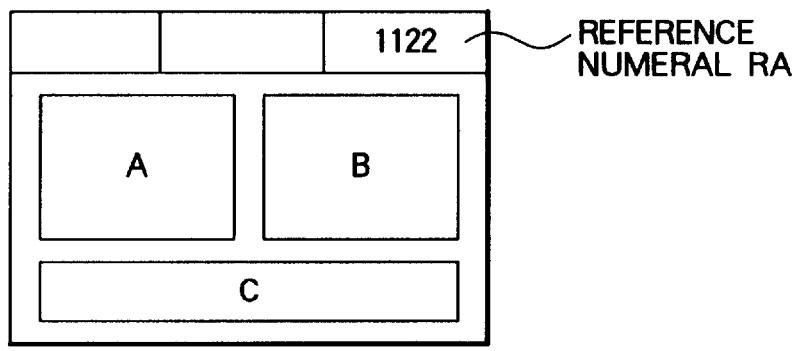
FIG. 2A and FIG. 2B are views illustrating the images displayed on monitor devices of terminal apparatuses shown in FIG. 1.
Figure 2B:
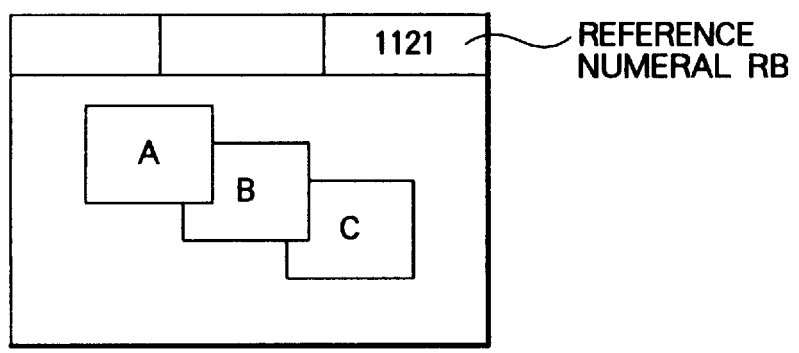

FIG. 2A and FIG. 2B are views illustrating the images displayed on the monitor devices 106a and 106b of the terminal apparatuses 10a and 10b shown in FIG. 1.

As shown in FIG. 1, the network 1 is constituted by a plurality of (two) terminal apparatuses 10a and 10b which are connected to each other via a communication line 20 and have a communication function. Each of the terminal apparatuses 10a and 10b comprises for example a personal computer and acts as an image display apparatus.

The terminal apparatuses 10a and 10b comprising the network 1 are respectively constituted by display content storage circuits (MEM) 100a and 100b, image control circuits 102a and 102b, image display circuits 104a and 104b, monitor devices 106a and 106b, communication interface circuits (I/F circuits) 108a and 108b. and keyboards 110a and 110b, which perform similar data communication to so-called general personal computer communication and, at the same time, notify the contents of the images respectively displayed on the monitor devices 106a and 106b between the terminal apparatuses 10a and 10b.

The monitor devices 106a and 106b are liquid crystal display devices, CRT display devices, etc.

The I/F circuits 108a and 108b perform the transmission and reception of data with the terminal of the other party communicated with via the communication line 20. That is, the I/F circuits 108a and 108b transmit the reference numerals indicating the image data displayed on the monitor devices 106a and 106b input from the image control circuits 102a and 102b to the other party communicated with and output the reference numerals sent from the other party communicated with to the image control circuits 102a and 102b.

The display content storage circuits 100a and 100b store the image data of a plurality of images prepared in advance to be commonly displayed on the monitor devices 106a and 106b and reference numerals respectively attached to these images in correspondence with each other. Further, the display content storage circuits 100a and 100b sequentially store the reference numerals from the other party communicated with input from the image control circuits 102a and 102b.

The image control circuits 102a and 102b read at least one series of image data among the plurality of series of image data stored in the display content storage circuits 100a and 100b and reference numerals attached to them and output them to the image display circuits 104a and 104b. Further, the image control circuits 102a and 102b read the image data corresponding to the reference numerals of the images from the other party communicated with received by the I/F circuits 108a and 108b from the display content storage circuits 100a and 100b according to need according to the operation data from the users of the terminal apparatuses 10a and 10b etc. and output them to the image display circuits 104a and 104b.

The image display circuits 104a and 104b display the image data input from the image control circuits 102a and 102b and the reference numerals corresponding to them on the monitor devices 106a and 106b.

Below, an explanation will be made of the operation regarding the data communication in the network 1 by taking as an example a case where the terminal apparatus 10a notifies the image displayed on the monitor device 106a to the terminal apparatus 10b referring to FIGS. 3A and 3B.

Figure 3A:
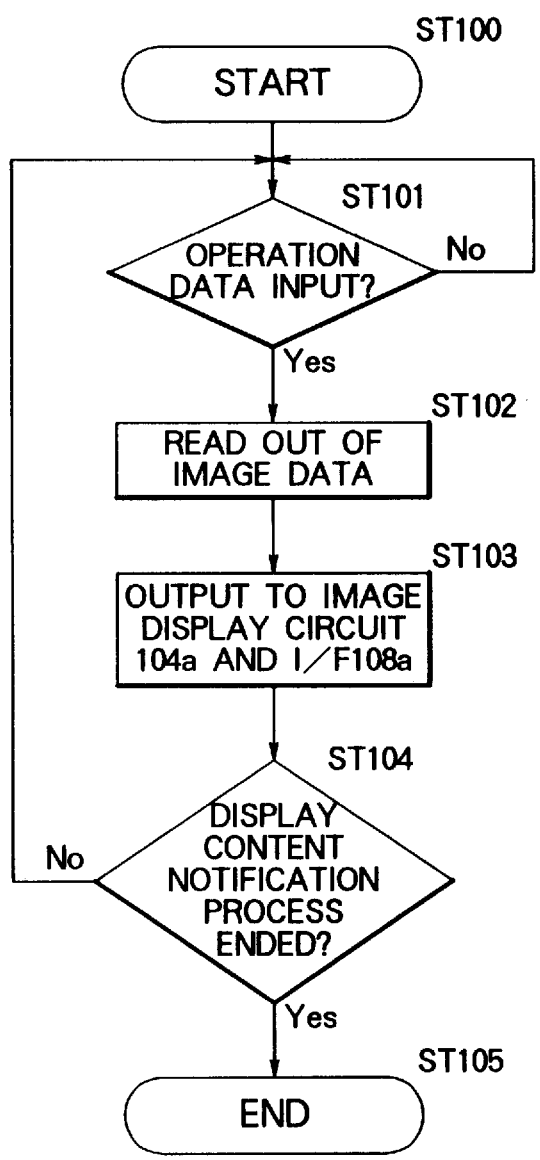

FIGS. 3A and 3B are flowcharts illustrating the operation of the image control circuits 102a and 102b shown in FIG. 1.

The user of the terminal apparatus 10a inputs to the image control circuit 102a operation data for displaying for example the image of reference numeral 1122 shown in FIG. 2A on the monitor device 106a from a keyboard 110a to the terminal apparatus 10a.

As shown in FIG. 3A, at step 100 (ST100), the image control circuit 102a starts the operation.

At step 101 (ST101), the image control circuit 102a determines whether or not the operation data is input. Where the operation data is input, the routine proceeds to the processing of step ST102.

At step 102 (ST102), the image control circuit 102a reads the image data corresponding to the reference numeral 1122 from the display content storage circuit 100a.

At step 103 (ST103), the image control circuit 102a outputs the read image data to the image display circuit 104a. By this, as shown in FIG. 2A, the image data corresponding to the reference numeral 1122 is displayed on the monitor device 106a. Further, at step ST103, the data indicating the reference numeral 1122 supplied from the image control circuit 102a to the I/F circuit 108a is transmitted from the I/F circuit 108a to the I/F circuit 108b of the terminal apparatus 10b via the communication line 20.

At step 104 (ST104), the image control circuit 102a determines whether or not the display content notification processing is ended. Where it has not been ended, the routine returns to the processing of step ST101, and where it is ended, the routine proceeds to the processing of step ST105, where the series of processing is ended.

The data indicating the reference numeral 1122 transmitted from the I/F circuit 108a of the terminal apparatus 10a via the communication line 20 is received by the I/F circuit 108b of the terminal apparatus 10b and input to the image control circuit 102b.

As shown in FIG. 3B, at step 201 (ST201), the image control circuit 102*b* of the terminal apparatus 10*b* determines whether or not the data indicating the reference numeral 1122 is input from the I/F circuit 108*b*. Where it is input, the routine proceeds to the processing of step ST202.

At step 202 (ST202), the image control circuit 102*b* stores the data indicating the reference numeral 1122 input from the I/F circuit 108*b* in the display content storage circuit 100*b*.

At step 203 (ST203), the image control circuit 102*b* outputs the data indicating the reference numeral 1122 to the image display circuit 104*b*. By this, the reference numeral "1122" is displayed on a predetermined part of the screen. Note that in FIG. 2A, a "reference numeral RA" indicates a situation where the reference numeral 1122 is displayed on the monitor device 106*b*.

Further, at step ST203, the user of the terminal apparatus 10*b* viewing the data indicating the reference numeral 1122 displayed on the monitor device 106*b* inputs operation data instructing the display of the image corresponding to the reference numeral 1122 on the monitor device 106*b* to the image control circuit 102*b* from the keyboard 110*b*.

At step 204 (ST204), the image control circuit 102*b* determines whether or not the operation data indicating to display the image corresponding to the reference numeral 1122 on the monitor device 106*b* is input in the processing of step ST203. Where it is input, the routine proceeds to the processing of step ST205.

At step 205 (ST205), the image control circuit 102*b* reads the image data corresponding to the reference numeral 1122 from the display content storage circuit 100*b*. Note that, as mentioned above, the image data showing common images in correspondence with the reference numerals are stored in advance in the display content storage circuits 100*a* and 100*b*.

At step 206 (ST206), the image control circuit 102*b* outputs the read image data corresponding to the reference numeral 1122 to the image display circuit 104*b*. By this, the image corresponding to the reference numeral 1122 is displayed on the monitor device 106*b*. Note that, in FIG. 2A, A, B, and C indicate a situation that the image corresponding to this reference numeral 1122 is displayed.

At step 207 (ST207), the image control circuit 102*b* determines whether or not the display content notification processing is ended. Where it is not ended, the routine returns to the processing of step ST201, and where it is ended, the routine proceeds to the processing of step ST208, where the series of processing is ended.

Note that the operation of notifying the image displayed on the monitor device 106*b* to the terminal apparatus 10*a* by the terminal apparatus 10*b* is the same.

Further, it is also possible to notify another image as shown in for example FIG. 2B to each other in addition to the image corresponding to the reference numeral 1122 shown in FIG. 1.

Further, the contents and number of the images which are displayed on the monitor devices 106*a* and 106*b* and the reference numerals which are notified to each other are not limited.

Further, it is possible for a plurality of images to be simultaneously displayed on the monitor devices 106*a* and 106*b*.

Further, where the image control circuits 102*a* and 102*b* are constituted so as to make the display content storage circuits 100*a* and 100*b* sequentially store data indicating the reference numerals received from for example the other party communicated with and sequentially display the image data respectively corresponding to the data indicating reference numerals stored by the display content storage circuits 100*a* and 100*b* on the monitor devices 106*a* and 106*b* according to the operation data, it is also possible for the user to view the same in a time series of the image displayed to the other party communicated with. That is, it is also possible to use the method of notification of display content according to the present invention and the apparatus for the same as a means for obtaining the history of images displayed on the terminal of the other party communicated with.

Further, even in a case where the transmission and reception of reference numerals are not automatically carried out between the terminal apparatuses 10*a* and 10*b*, the users of the terminal apparatuses 10*a* and 10*b* may input the reference numerals displayed on the monitor devices 106*a* and 106*b* from the keyboards 110*a* and 110*b* and transmit the same, whereby they can be informed to the other party communicated with. Further, in addition to informing the reference numerals to the other party communicated with via the network 1, it is also possible to orally inform the reference numerals by for example a telephone or FAX.

By constituting the terminal apparatuses 10*a* and 10*b* connected to the network 1 as mentioned above, for example, remote diagnosis for checking the operating circumstances of the terminal apparatus 10*b* from the terminal apparatus 10*a* can be carried out. Even if the terminal apparatuses 10*a* and 10*b* are used for such a purpose, not only can the amount of data transmitted via the communication line 20 be made small, but also the content of the image displayed on the screen can be correctly notified to the other party communicated with.

Further, for example, where a consultation from the user of the terminal apparatus 10*b* is fielded by using the terminal apparatus 10*a* for after-sales service for the terminal apparatus 10*b*, the content of the image displayed on the terminal apparatus 10*b* can be correctly notified from the terminal apparatus 10*b* side to the terminal apparatus 10*a* side and therefore the after-sales service becomes simple and easy. Further, in such a case, also troubleshooting of the terminal apparatus 10*b* can be simply and easily carried out.

Further, even in a case where the same images should be displayed on the terminal apparatuses 10*a* and 10*b*, the amount of data to be transmitted can be made very small, therefore it is also possible to use any of a radio communication line, infrared ray communication line, CATV line, and ISDN line as the communication line 20.

As mentioned above, among a plurality of terminals, the content of the image displayed on a certain terminal can be correctly notified to the other terminal.

Further, even in a case where a common image is to be displayed at a plurality of terminals connected to the network, the time required for the transmission of the data is short and in addition a high speed communication line is not required.

Note that, needless to say, the present invention is not limited to the above embodiment and can modified in various ways within a range not out of the gist of the present invention.

INDUSTRIAL APPLICABILITY

The method of notification of display content according to the present invention and the apparatus for the same can be applied to a network in which a plurality of terminals such as personal computers are connected via communication lines such as telephone lines and data is transmitted to and received from each other.

We claim:

1. A method of notification of display content for notifying the display content of a predetermined screen of an image display apparatus to another party communicated with, wherein:

a predetermined reference numeral is attached to each of a plurality of images to be displayed on said predetermined screen;

at least one image among said plurality of images and said reference numerals individually attached to these images is displayed on the predetermined screen of said image display apparatus; and at least one reference numeral among those of said plurality of images is notified to the other party communicated with.

2. A method of notification of display content according to claim 1, wherein:

said other party communicated with stores the data of said plurality of images and said reference numerals in advance into correspondence with each other; and displays at least one image among said plurality of images individually corresponding to said notified reference numerals on a predetermined screen of a monitor screen.

3. A method of notification of display content according to claim 1, wherein:

said other party communicated with sequentially stores said notified reference numerals and displays the images corresponding to the stored reference numerals on a predetermined screen of a monitor screen along with the elapse of time in accordance with an outside operation.

4. A display content notifying apparatus for mutually notifying the contents of images respectively displayed by a plurality of image display apparatuses between these plurality of image display apparatuses connected to each other via predetermined communication lines, wherein each of said plurality of image display apparatuses has:

a monitor means;

a storing means for storing data of a plurality of images to be commonly displayed at said plurality of image display apparatuses and reference numerals commonly attached to these images respectively in said plurality of image display apparatuses in correspondence with each other;

a first displaying means for displaying at least one image of said stored plurality of images and the reference numeral of the image on said monitor means;

a notifying means for notifying said reference numerals of the images displayed on said monitor means to at least one among the other image display apparatuses via said communication line; and a second displaying means for displaying at least said reference numerals notified from any of the other image display apparatuses via said communication line on said monitor means.

* * * * *